United States Patent [19]

Brooks et al.

[11] Patent Number: 5,908,500
[45] Date of Patent: Jun. 1, 1999

[54] ACTIVATED CLAY COMPOSITION AND METHOD

[75] Inventors: David D. Brooks, Woodstock; Darlene M. Hansen, Fox River Grove; Dov Shaked, Buffalo Grove, all of Ill.

[73] Assignee: Oil-Dri Corporation of America, Chicago, Ill.

[21] Appl. No.: 08/907,249

[22] Filed: Aug. 6, 1997

Related U.S. Application Data

[63] Continuation-in-part of application No. 08/314,887, Sep. 29, 1994, abandoned.

[51] Int. Cl.$^6$ ............................................. C09C 1/02
[52] U.S. Cl. .................. 106/486; 106/287.17; 106/487; 106/488; 501/146; 501/148
[58] Field of Search ............................. 106/287.17, 486, 106/487, 488; 501/146, 148

[56] References Cited

U.S. PATENT DOCUMENTS

| | | | |
|---|---|---|---|
| 1,492,184 | 4/1924 | Weir et al. ................................. | 502/81 |
| 2,671,058 | 3/1954 | Mickelson ................................. | 502/83 |
| 2,872,419 | 2/1959 | Farnand et al. ........................... | 502/83 |
| 2,928,853 | 3/1960 | Bond, Jr. .................................. | 502/217 |
| 2,934,504 | 4/1960 | Talvenheimo ............................. | 502/62 |
| 3,963,852 | 6/1976 | Baxter ...................................... | 427/145 |
| 4,443,379 | 4/1984 | Taylor et al. .............................. | 502/65 |
| 4,830,843 | 5/1989 | Usui et al. ................................ | 502/251 |
| 4,839,096 | 6/1989 | Dennis et al. ........................ | 252/8.515 |
| 5,004,570 | 4/1991 | Brooks et al. ........................... | 426/254 |
| 5,008,226 | 4/1991 | Taylor et al. .............................. | 502/81 |
| 5,008,227 | 4/1991 | Taylor et al. .............................. | 502/83 |
| 5,326,734 | 7/1994 | Vaughn ..................................... | 502/84 |
| 5,358,915 | 10/1994 | Nebergall et al. ........................ | 502/27 |
| 5,384,059 | 1/1995 | Klein et al. ............................... | 252/73 |

*Primary Examiner*—Mark L. Bell
*Assistant Examiner*—Scott L. Hertzog
*Attorney, Agent, or Firm*—Olson & Hierl, Ltd.

[57] ABSTRACT

High performance acid activated clays suitable for bleaching oil are produced by contacting an intercalating clay mineral with a strong acid in a polar organic liquid.

29 Claims, No Drawings

ACTIVATED CLAY COMPOSITION AND METHOD

CROSS-REFERENCE TO RELATED APPLICATION

This application is a continuation-in-part of U.S. Ser. No. 08/314,887 filed on Sep. 29, 1994, abandoned.

TECHNICAL FIELD

This invention relates to clay-based compositions suitable for the bleaching of oil. In particular, the present invention is directed to oil bleaching compositions treated with a polar organic compound and an acid.

BACKGROUND OF THE INVENTION

Fats and fatty oils, commonly called triglycerides, are constituted of triesters of glycerol, and include minor amounts of fatty acids. At ambient temperatures, usually in the range of about 20° to about 25° C., fats are solids, whereas fatty oils are liquids.

Triglycerides are widely distributed in nature. Some triglycerides are edible while others are not. Many are derived directly from vegetable, animal, and marine sources. Others are obtained, as by-products, in the production of fiber from vegetable matter, and in the production of protein from vegetable, animal or marine matter.

Edible vegetable oils include canola, coconut, corn germ, cottonseed, olive, palm, peanut, rapeseed, safflower, sesame seed, soybean, and sunflower oils. Examples of nonedible vegetable oils are jojoba oil, linseed oil and castor oil.

Illustrative sources of edible animal-derived oil include lard and tallow. Examples of nonedible animal-derived oil are low grade tallow and neat's-foot oils.

Some of these oils may have the color that is objectionable to a consumer. Thus, the oil needs to be bleached to improve its color quality. To this end, a great many oils are commonly treated with bleaching clays to reduce oil color values by adsorptive purification. Bleaching clays generally improve oil color quality by adsorbing color impurities that are present. Color impurities typically present in oils include, for example, carotenoids, xanthophylls, xanthophyll esters, chlorophyll, tocopherols, as well as oxidized fatty acids and fatty acid polymers.

It is also desirable to remove color impurities from a nonedible oil to obtain a desirable color.

Natural clays, e.g., Fuller's earth and the bentonites, have commonly been used as bleaching clays to remove both the naturally-occurring and the otherwise-present, e.g., the thermally-induced, color impurities from edible and nonedible oils. It has been suggested that clays containing a zeolite can be used for such a purpose as well.

Kaolin clays, on the other hand, have proven to be poor bleaching clays under various conditions. This is due, in part, to the fact that kaolin clays are considered non-intercalating, with the exception of halloysite which occurs in nature as a very unstable hydrate. See, e.g., van Olphen, H., *An Introduction to Clay Colloid Chemistry*, 2nd ed., Wiley-Interscience Publication (1977); p. 186.

U.S. Pat. No. 2,934,504 to Talvenheimo discloses the use of kaolin clays as catalysts for the cracking of hydrocarbons. In every example Talvenheimo teaches a treatment method which subjects the kaolin clay to drying conditions of four hours at 1350° F. (732° C.). The teaching of this drying treatment exemplifies the great differences between bleaching activity, the object of the present invention, and catalytic activity, the object of the Telvenheimo patent.

Acid-activated clays have been used for bleaching oils. Such clays generally remove a relatively wider spectrum of color impurities.

A conventional process for producing acid-activated bleaching clays utilizes calcium bentonite clays and sulfuric acid. The calcium bentonites used in the acid activation process typically are neutral to mildly basic. The acidic salts formed during activation and residual acid can be washed off and separated by filtration from the product clay, if desired. However it is not necessary to do so.

Another type of naturally-occurring clay, frequently classified as palygorskite clays, requires heat to impart bleaching activity. Mineralogically, the palygorskite clays are distinguishable from the bentonites (smectites or montmorillonites).

SUMMARY OF THE INVENTION

Highly active clay-derived bleaching compositions are obtained by acid activation of an intercalating clay mineral in the presence of a polar organic liquid such as an aliphatic $C_1$ to $C_6$ monohydric alcohol or an aliphatic $C_2$ to $C_6$ aliphatic ether. Acid activation with an inorganic acid or with an organic acid in this manner can be effected at ambient temperatures, and in a relatively short time period, usually of the order of minutes. After acid activation, the obtained product is air dried, size reduced and classified if desired, and is then ready for use.

DESCRIPTION OF PREFERRED EMBODIMENTS

While this invention is susceptible to embodiments in many different forms, preferred embodiments of the invention are described below. It should be understood, however, that the present disclosure is to be considered as a exemplification of the principles of the invention and is not intended to limit the invention to the specific embodiments illustrated.

The compositions of the present invention are acid activated clay intercalates and are useful for reducing the amount of color impurities in an oil.

Throughout this application, the term "oil," and the grammatical variations thereof, includes vegetable-derived, animal-derived as well as marine source-derived fats and fatty oils that are liquids at the particular temperature that is necessary for desired processing of a particular type of oil.

In use, the oil and the present oil bleaching composition are combined in a suitable vessel to produce a slurry. The resulting slurry is maintained at an elevated temperature and at a pressure no greater than about atmospheric pressure for a time period sufficient to reduce the amount of color impurities of the oil without causing degradation of the oil, i.e., the oil is bleached substantially without thermal decomposition of the oil. A bleached oil is then recovered from the slurry.

The bleaching is performed at a temperature elevated above room temperature, i.e., at about 30° C. and higher, but below the temperature that induces thermal decomposition of the oil. A preferred bleaching temperature is in a range of about 50° to about 130° C., more preferably about 60° to about 125° C.

The pressure at which the bleaching is performed can be atmospheric or less than atmospheric (subatmospheric), as desired. A preferred reduced pressure is in a range of about 1 to about 5 inches of mercury. A most preferred reduced pressure is about 4 inches of mercury.

The time period sufficient to reduce the amount of color impurities in the oil utilizing the present bleaching compositions usually is in a range of about 5 to about 90 minutes.

Oils that can be bleached using the composition of the present invention include both edible and inedible oils. Illustrative oils are those previously mentioned hereinabove.

Clays suitable for the activating treatment of the present invention are intercalating clays, i.e., those clays that admit organic compounds of polar or ionic character into channels formed by the arrangement of octahedral units and tetrahedral units, or between stacked layers formed by an octahedral sheet and one or more tetrahedral sheets of the atoms that constitute the clay mineral structure. Illustrative are the naturally occurring clay minerals of the hormite group such as the palygorskites and the sepiolites, which define channels formed by octahedral units and tetrahedral units of the clay mineral structure, and the bentonites (montmorillonites and smectites) which are constituted by stacked layers formed by an octahedral sheet and one or more tetrahedral sheets, and mixtures of the foregoing. Previously acid activated bleaching clays, such as those commercially available, e.g., FILTROL® 105 SF, PURE-FLO® Supreme, and the like, are also suitable. As to the latter grouping of clay minerals, the bleaching activity of these acid activated bleaching clays (usually acid-treated calcium bentonites) can be further enhanced by the treatment provided by the process of the present invention.

Of course, not all clay materials are suitable for use in an oil bleaching process. Kaolin clay is considered to be a poor bleaching clay. In Example 1 below, the results of which are shown in Table I, kaolin clay does not perform as a bleaching clay, in contradistinction to a palygorskite-smectite clay composition, when subjected to the present process.

Clay minerals preferred as starting materials for making the present compositions are neutral clays that already exhibit some bleaching activity. These clays have a pH value in the range of about 7 to about 9. The pH value of the clay is determined from a 5-weight percent slurry of the clay in distilled water. The slurry is agitated for three minutes prior to measurement of the pH value by a conventional pH meter.

Palygorskite (attapulgite)- and smectite-containing neutral bleaching clays are particularly preferred as starting materials for the present purposes.

Palygorskite (attapulgite), a mineral found in some clays, is a hydrous silicate material represented by the approximate formula:

$(OH_2)_4(OH)_2Mg_5Si_8O_{20} \cdot 4H_2O$.

See, e.g., Grim, R. E., *Clay Mineralogy*, 2nd ed., McGraw-Hill, Inc., New York, N.Y. (1968), p. 115.

Smectite is a generic term that refers to a variety of related minerals also found in some clays. The smectite minerals typically occur only as extremely small particles. Generally, smectite is believed to be composed of units made of two silica tetrahedral sheets with a central alumina octahedral sheet. Each of the tetrahedra has a tip that points to the center of the smectite unit. The tetrahedral and octahedral sheets are combined so that the tips of the tetrahedra of each silica sheet and one of the hydroxyl layers of the octahedral sheet form a common layer. See Id., pp. 77–78.

In particular, the smectite family of clays includes the various mineral species montmorillonite, nontronite, hectorite and saponite, all of which can be present in clay in varying amounts.

Other minerals, neither of the smectite genus nor of the palygorskite variety, that can be present in clay include apatite, calcite, the feldspars, kaolinite, mica, quartz and sepiolite.

A polar organic liquid suitable for practicing the present invention is one the molecules of which penetrate between the clay mineral layers or into the defined channels of the clay mineral and can displace interlayer water molecules that are present. Preferably the Polarity Index (P.I.) of such liquids is greater than about 1.5 but less than that of water.

The term "Polarity Index" as used herein and in the appended claims is determined according to Snyder, J. Chromatographic Science 16:223–234 (1978).

Polar organic liquids well suited for the present purposes are the $C_1$ to $C_6$ aliphatic monohydric alcohols, e.g., methanol (P.I.=5.1), ethanol (P.I.=4.3), isopropanol (P.I.=3.9), n-propanol (P.I.=4.0), n-butanol (P.I.=3.9), isobutanol (P.I.=3.9), t-butanol (P.I.=4.1), isopentanol (P.I.=3.7), n-hexanol, mixtures thereof, and the like, and the $C_2$ to $C_6$ aliphatic ethers, e.g., dimethyl ether, diethyl ether (P.I.=2.8), methyl ethyl ether, diisopropyl ether (P.I.=2.4), n-butyl ether (P.I.=2.1), mixtures thereof, and the like.

The polar organic liquid may be used alone or in an admixture with a non-polar organic liquid such as a liquid aliphatic hydrocarbon, e.g., hexane or heptane.

The volume ratio for the admixtures of a polar liquid with a non-polar liquid can vary over a relatively wide range as long as a sufficient amount of the polar liquid is present to effect the desired degree of activation. From a processing perspective, it is preferable to utilize azeotropic admixtures inasmuch as the admixture recovered upon drying can be readily recycled and reused. To that end, particularly preferred are the ethanol/n-heptane binary azeotrope boiling at about 72° C. (760 mm Hg) and constituted by about 67 mole-% ethanol and 33 mole-% n-heptane, and the ethanol/n-hexane binary azeotrope boiling at about 59° C. (760 mm Hg) and constituted by about 33.2 mole-% ethanol and about 66.8 mole-% n-hexane.

For acid activation of the intercalating clay mineral, the acid can be inorganic or organic having a pKa value not greater than about 7. Mineral acids such as hydrochloric acid, phosphoric acid or sulfuric acid are preferred. Particularly preferred is sulfuric acid in a relatively high concentration.

Also suitable are strong organic acids such as formic acid (HCOOH; pKa=3.75), acetic acid ($CH_3COOH$; pKa=4.76), oxalic acid (HOOCCOOH; pKa=1.25 and 4.14), citric acid (pKa=3.14, 4.77 and 6.39) and the like.

The intercalating clay mineral to be acid activated in accordance with the present invention can be wet or dry, as desired. That is, the clay mineral can contain as much as about 55 weight percent free moisture, preferably no more than about 50 weight percent free moisture. The clay mineral is combined with an acid/polar liquid admixture so as to form a slurry which is then agitated for a relatively brief time period in the range of about 1 to about 3 minutes. Thereafter the slurry is filtered to remove the polar organic liquid and air dried, usually at about ambient temperature, to a volatile matter content of no more than about 35 weight percent, preferably about 20 weight percent, more preferably about 10 weight percent, based on the weight of the clay mineral, to produce a bleaching clay product that exhibits enhanced bleaching activity. The produced bleaching clay product can be used as is, or it can be subjected to a size reduction procedure, e.g., pulverization, prior to packaging and use.

For bleaching an oil, the amount of the present bleaching clay that is combined with the oil to be bleached usually is in the range of about 1 to about 5 weight percent, based on the weight of the oil. Lesser or larger amounts can be used, depending upon the oil to be treated and the severity of the desired bleaching treatment.

The acid activation process embodying the present invention can be carried out batchwise, or as a continuous process, as convenient. The continuous activation process can be a countercurrent process or a co-current process. The agitation of the clay/acid/polar liquid slurry during the activation process can be readily achieved by the use of a static mixer, a commercially available blender, or the like expedient.

The present invention is illustrated by the following examples. In these examples the red color of the treated oil was monitored in accordance with American Oil Chemists Society (AOCS) Official Method CC13b-45, and light absorption at 450 nanometers (nm).

EXAMPLE 1

Suitable Bleaching Clays: Kaolin Clay vs. Palygorskite/Smectite Clay

An experimental matrix was set up using two clay types: a non-intercalating kaolin clay and an intercalating palygorskite-smectite clay. Six samples of each clay type were tested with various preparations as a soybean oil bleach, and three samples of each clay type were tested as a corn oil bleach. Each clay sample weighed 250 grams at 45 wt-% free moisture and was either (1) dried and ground (no treatment: NT); (2) treated with methanol only and dried and ground (methanol only: M); or (3) treated with methanol and 1000 milliliters of 0.3 M sulfuric acid, then dried and ground (methanol with acid and water: MAW). The samples were dried at 100° C. or 732° C. for one hour.

In the soybean oil examples a 0.5% clay by weight sample was used in 100 grams of refined soybean oil. The samples remained in the oil for 30 minutes, at 248° F. and 27" Hg. In the corn oil examples a 3.0% clay by weight sample was used in 100 grams of refined corn oil. The samples remained in the oil for 30 minutes, at 220° F. and 27" Hg. The observed results are presented in Table 1 below.

TABLE I

Soybean Oil and Corn Oil Bleaching

| Clay (Treatment) | Drying[3] Temp.(° C.) | Red Color | Yellow Color | Chlorophyll (ppb) |
|---|---|---|---|---|
| Soybean Oil: | | | | |
| Kaolin[1] (NT) | 100 | 14.4 | 70 | 778 |
| Kaolin (M) | 100 | 14.2 | 70 | 748 |
| Kaolin (MAW) | 100 | 14.4 | 70 | 507 |
| Kaolin (NT) | 732 | 19.4 | 70 | 886 |
| Kaolin (M) | 732 | 17.2 | 70 | 881 |
| Kaolin (MAW) | 732 | 18.3 | 70 | 757 |
| T.C. Ga[2] (NT) | 100 | 4.1 | 70 | 212 |
| T.C. Ga (M) | 100 | 3.6 | 70 | 182 |
| T.C. Ga (MAW) | 100 | 3.4 | 70 | 162 |
| T.C. Ga (NT) | 732 | 8.9 | 70 | 315 |
| T.C. Ga (M) | 732 | 7.5 | 70 | 177 |
| T.C. Ga (MAW) | 732 | 8.8 | 70 | 298 |
| Starting Oil | NA | 10.9 | 70 | 1068 |
| Corn Oil: | | | | |
| Kaolin (NT) | 100 | 12.1 | 70 | NA |
| Kaolin (MAW) | 100 | 12.8 | 70 | NA |
| Kaolin (MAW) | 732 | 13.3 | 70 | NA |

TABLE I-continued

Soybean Oil and Corn Oil Bleaching

| Clay (Treatment) | Drying[3] Temp.(° C.) | Red Color | Yellow Color | Chlorophyll (ppb) |
|---|---|---|---|---|
| T.C. Ga (NT) | 100 | 4.4 | 70 | NA |
| T.C. Ga (MAW) | 100 | 2.3 | 30 | NA |
| T.C. Ga (MAW) | 732 | 4.7 | 70 | NA |
| Starting Oil | NA | 11.7 | 70 | NA |

[1]Clay Minerals Society Source Clay Minerals Repository, KGa-1, Washington Co., Ga.
[2]Palygorskite-Smectite Clay (Thomas County, Ga.).
[3]Dried for one hour at indicated temperature.

It is evident from the results shown in Table I above that kaolin is not a bleaching earth. Under all conditions oils treated with kaolin had darker colors than the initial starting oil.

The soybean oil data shows that treatment with methanol (at 100° C.) had virtually no effect on the bleaching activity of the kaolin sample, and very little effect on the palygorskite-smectite clay (only a 12% reduction in red color). The same was true for the kaolin sample treated with the acidulated methanol at 100° C. On the other hand, the bleaching activity of the palygorskite-smectite clay improved by about 17% over the "no treatment." The corn oil test data (at 100° C.) reveal similar effects on the two clay types with the bleaching activity of the palygorskite-smectite clay improving about 47%.

The data also shows that drying the clays (both kaolin and palygorskite-smectite) at 732° C., even for only one hour, affected adversely the bleaching activity.

EXAMPLE 2

Acid Activation Using Ethanolic Sulfuric Acid

Attapulgite-smectite clay was pre-treated with concentrated aqueous sulfuric acid (18M; 3 wt.-% $H_2SO_4$). Aliquots of this pre-treated clay were combined with sulfuric acid in 95% ethanol (224 grams of clay at ~47 wt.-% free moisture with 1000 ml of 0.03M $H_2SO_4$ in ethanol and 256 grams of clay at ~47 wt.-% free moisture with 1000 ml of 0.15M $H_2SO_4$ in ethanol). The resulting slurries were stirred for about 30 minutes at ambient temperature (about 25° C.), filtered using a Buchner filter, and air dried at ambient temperature to a volatile matter content of less than about 20 weight percent.

The air dried products were then pulverized to a mean particle size of about 25 to 30 microns and used to bleach corn oil with 3 wt.-% dose of the clay for about 30 minutes. The observed results are presented in Table II, below.

TABLE II

Bleaching Performance

| Bleaching Clay | Red Color Value | Absorbance @ 450 nm |
|---|---|---|
| None | 8.1 | 1.885 |
| Commercial Product[1] | 1.5 | 0.171 |
| A/S[2] (3 wt.-% $H_2SO_4$) | 2.5 | 0.261 |
| A/S[2] (3 wt.-% $H_2SO_4$) | 2.5 | 0.265 |
| A/S[2] (3 wt.-% $H_2SO_4$) | 2.5 | 0.236 |
| A/S[2] (0.03 M $H_2SO_4$/EtOH/30 min.) | 2.0 | 0.215 |
| A/S[2] (0.15 M $H_2SO_4$/EtOH/30 min.) | 1.6 | 0.186 |
| A/S[2] (0.15 M $H_2SO_4$/EtOH/30 min.) | 1.3 | 0.131 |

TABLE II-continued

Bleaching Performance

| Bleaching Clay | Red Color Value | Absorbance @ 450 nm |
|---|---|---|
| A/S[2] (0.3 M $H_2SO_4$/EtOH/30 min.) | 1.0 | 0.124 |
| A/S[2] (0.15 M $H_2SO_4$/EtOH/10 min.) | 1.1 | 0.150 |
| A/S[2] (0.3 M $H_2SO_4$/EtOH/10 min.) | 1.2 | 0.142 |
| A/S[2] (3 wt.-% $H_2SO_4$;EtOH/$H_2O$/30 min.) | 2.4 | 0.259 |
| A/S[2] (3 wt.-% $H_2SO_4$;EtOH/$H_2O$/60 min.) | 2.1 | 0.247 |

[1]FILTROL ® 105 SF, available from Engelhard Corporation.
[2]Attapulgite-smectite mixture.

The data presented in Table II, above, clearly demonstrate the enhanced bleaching activity of clays treated with ethanolic sulfuric acid as compared to the same clay acid-activated using 3 weight percent sulfuric acid in conventional manner with or without a follow-up treatment only with ethanol/water mixtures.

EXAMPLE 3

Acid Activation of Various Clays with Ethanolic Sulfonic Acid

Clays from various sources were combined with sulfuric acid in 95% ethanol (250 grams of clay at ~47 wt.-% free moisture with 1000 ml of 0.15M $H_2SO_4$ in 95% ethanol). The slurries thus produced were stirred for about 5 minutes at ambient temperature (about 25° C.), filtered, and air dried at ambient temperature to a volatile matter content of about 10 weight percent.

The air dried products were then pulverized (80% through 325 mesh, U.S. Sieve Series) and used to bleach corn oil for 30 minutes at a 3 wt.-% dose. The observed results are presented in Table III, below.

TABLE III

Corn Oil Bleached With Various Clays

| Bleaching Clay | Red Color Value | Absorbance @ 450 nm |
|---|---|---|
| None | 8.1 | 1.885 |
| THOMAS COUNTY, GA CLAY, AREA 1[1] | | |
| base clay | 2.1 | 0.247 |
| treated clay | 1.7 | 0.203 |
| % improvement | 20 | |
| THOMAS COUNTY, GA CLAY, AREA 2[1] | | |
| base clay | 2.3 | 0.233 |
| treated clay | 1.6 | 0.167 |
| % improvement | 30 | |
| THOMAS COUNTY, GA CLAY, AREA 3[1] | | |
| base clay | 2.2 | 0.233 |
| treated clay | 1.5 | 0.173 |
| % improvement | 32 | |
| TIPPAH COUNTY, MS CLAY[2] | | |
| base clay | 2.8 | 0.286 |
| treated clay | 2.3 | 0.228 |
| % improvement | 18 | |

[1]palygorskite-smectite mixture
[2]smecite-opal mixture

EXAMPLE 4

Acid Activation of Clay with Polar Liquids

Clay aliquots from Thomas County, Ga., Area 2 Mine (palygorskite/smectite; 250 g, ~47 wt.-% free moisture, through 3/16-inch screen) were treated with sulfuric acid dispersed in various polar liquids. The treatment was performed as in Example 3 but with the indicated solvent in place of ethanol.

Activated clay products obtained in the foregoing manner were tested by bleaching corn oil exhibiting a Red Color Value of about 8.1 and Absorbance @450 nm of about 1.885. The bleaching was performed at a 3 weight percent dosage for a time period of 30 minutes. The observed results are presented in Table IV, below.

TABLE IV

Bleaching Efficacy

| Polar Liquid Treatment | Polarity Index | Red Color Value | Absorbance @ 450 nm |
|---|---|---|---|
| ethanol | 4.3 | 1.1 | 0.135 |
| iso-propyl alcohol | 3.9 | 1.1 | 0.143 |
| methyl alcohol | 5.1 | 1.3 | 0.154 |
| hexane | 0.1 | 2.1 | 0.211 |
| ethyl ether | 2.8 | 1.5 | 0.165 |
| water | 10.2 | 2.7 | 0.195 |
| 1,2-propanediol, 99%[1] | | 3.6 | 0.352 |
| 1,2-propanediol, 99%[2] | | 3.2 | 0.292 |
| hexane/iso-propyl alcohol (vol. ratio 1:1) | | 1.6 | 0.224 |
| heptane/ethanol (vol. ratio 7:3) | | 1.5 | 0.203 |

[1]6.6% Free Volatiles.
[2]1.2% Free Volatiles.

EXAMPLE 5

Duration of Activation Treatment

Clay aliquots from a Georgia mine of Oil-DriCorporation of America (palygorskite/smectite; 250 g, ~47 wt.-% free moisture, through 3/16-inch screen) treated with 1000 milliliters of 0.3 M sulfuric acid in 95% ethanol in a manner similar to Example 2, above, were used to bleach corn oil for 30 minutes. The amount of clay was about 3 weight percent, based on the weight of oil. The observed results are presented in Table V, below.

TABLE V

Effect of Activation Duration

| Bleaching Clay | Activation Time, min. | Red Color Value | Absorbance @ 450 nm |
|---|---|---|---|
| Palygorskite/Smectite | 10 | 1.0 | 0.132 |
| Palygorskite/Smectite | 5 | 1.2 | 0.154 |
| Palygorskite/Smectite | 0.25 | 1.1 | 0.144 |
| None | N/A | 8.1 | 1.885 |

Data in the foregoing Table indicate that the activation process is virtually instantaneous when the acid activated bleaching clays of the present invention are utilized.

EXAMPLE 6

Peformance Enhancement of Commercially Available Bleaching Clays

The procedure typically used to treat raw clay was modified to compensate for the difference in percent free moisture between the raw clays (47% free moisture) and the commercial products (10–15% free moisture). The modification involves adding water to the clay/ethanol slurry to bring the total water in the system to similar levels as found in the process using raw clay. The ratios of dry weight clay to total weight of water and total volume of acidified ethanol were held constant.

Comparison of Procedures:
Raw Clay Method:
250 g raw clay (47% free moisture)
1000 mL acidified ethanol (50 mL 3.3 M $H_2SO_4$ in 1000 ml ethanol)
5 minutes slurry time
Filtered, dried and pulverized
Clay (dry weight) to ethanol (volume) ratio: 0.13
Clay (dry weight) to water (weight) ratio: 0.47
  Commercial Clay Method:
36.25 g processed clay (10–15% free moisture)
27.5 g water
250 mL acidified ethanol (50 mL 3.3 M $H_2SO_4$ in 1000 ml ethanol)
5 minutes slurry time
Filtered, dried and pulverized
Clay (dry weight) to ethanol (volume) ratio: 0.13
Clay (dry weight) to water (weight) ratio: 0.50

The treated clays were then used at various dosages to bleach canola oil and corn oil. The corn oil was bleached at 220° F. (104° C.) for 30 minutes under 25 inches Hg vacuum, and the canola oil was bleached at 230° F. (110° C.) for 30 minutes under 25 inches Hg vacuum. The observed results are presented in Tables VI–VIII, below.

TABLE VI

Corn Oil Bleaches (3 wt.-% Clay)

| Clay | Red Color | Absorbance 450 nm 1 cm cell | Percent Improvement Red Color | Percent Improvement Absorbance |
|---|---|---|---|---|
| Optimum FF | 2.8 | 0.290 | | |
| Treated Optimum FF Lo[1] | 2.8 | 0.297 | 0.00% | -2.41% |
| Tonsil Supreme | 2.7,3.0 | 0.263,.281 | | |
| Treated Tonsil Supreme Lo | 2.4,2.5 | 0.224,.235 | 14.04% | 15.62% |
| Acticil | 3.1 | 0.303 | | |
| Treated Acticil Lo | 2.8 | 0.295 | 9.68% | 2.64% |
| Filtrol 105 SF | 2.5 | 0.248 | | |
| Treated Filtrol 105 SF Lo | 1.9 | 0.191 | 24.00% | 22.98% |
| Filtrol 160 | 2.5 | 0.228 | | |
| Treated Filtrol 160 Lo | 2.0 | 0.174 | 20.00% | 23.68% |
| Fulmont Premiere | 2.9,2.8 | 0.265,.278 | | |
| Treated Fulmont Premiere Lo | 2.7,3.1 | 0.250,.274 | -1.75% | 3.50% |
| Fulmont AA | 3.1 | 0.300 | | |
| Treated Fulmont AA Lo | 2.8 | 0.264 | 9.68% | 12.00% |
| Gallion V2 | 2.4 | 0.229 | | |
| Treated Gallion V2 Lo | 2 | 0.173 | 16.67% | 24.45% |
| Gallion V1 | 2.8 | 0.264 | | |
| Treated Gallion V1 Lo | 2.9 | 0.260 | -3.57% | 1.52% |
| Clarion 470 | 2.5,3.1 | 0.271,.273 | | |
| Treated Clarion 470 Lo | 2.3,2.7 | 0.229,.239 | 10.71% | 13.97% |
| Clarion 212 | 2.9,3.0 | 0.263,.277 | | |
| Treated Clarion 212 Lo | 2.9,2.8 | 0.254,.225 | 3.39% | 11.30% |
| Sienna Indonesia | 2.5,2.7 | 0.256,.266 | | |
| Treated Sienna Indonesia Lo | 2.5,2.8 | 0.244,.257 | 1.92% | 4.02% |
| Pure-Flo B80 | 3.3 | 0.313 | | |
| Treated Pure-Flo B80 Lo | 3.3 | 0.340 | 0.00% | -8.63% |
| Pure-Flo Supreme | 3.3 | 0.323 | | |
| Treated Pure-Flo Supreme Lo | 2.9 | 0.271 | 12.12% | 16.10% |
| RAW (12% FM)[2] | 3 | 0.295 | | |
| Treated Lo | 2.4 | 0.235 | 20.00% | 20.34% |
| Treated Hi[1] | 2.2 | 0.228 | 26.67% | 22.71% |
| Starting Oil | 7.7 | 1.673 | N/A | N/A |

[1]Lo and Hi denote acid strength of acidified ethanol (.15 M and .30 M, respectively)
[2]Thomas County, GA clays, Area 2

TABLE VII

Canola Oil Bleaches (1.5 wt.-% Clay)

| Clay | Red Color 1" Path | Absorbance 450 nm 1 cm Cell | Chlorophyll PPB | Percent Improvement Red Color | Percent Improvement Absorbance | Percent Improvement Chlorophyll |
|---|---|---|---|---|---|---|
| Pure-Flo Supreme | 1.4 | 0.687 | 1009 | | | |
| Treated Pure-Flo Supreme Lo[1] | 1.1 | 0.543 | 576 | 21% | 21% | 43% |
| Treated Pure-Flo Supreme Hi[1] | 1.1 | 0.620 | 586 | 21% | 10% | 42% |
| Filtrol 105 SF | 1.4 | 0.738 | 1142 | | | |
| Treated Filtrol 105 SF Lo | 1.1 | 0.591 | 659 | 21% | 20% | 42% |
| Fulmont Premiere | 1.7 | 1.209 | 1540 | | | |
| Treated Fulmont Premiere Lo | 1.3 | 0.664 | 979 | 24% | 45% | 36% |
| Tonsil Supreme | 1.4 | 0.64 | 802 | | | |
| Treated Tonsil Supreme Lo | 1.3 | 0.638 | 669 | 7% | 0% | 17% |
| Gallion V2 | 0.8 | 0.435 | 374 | | | |
| Treated Gallion V2 Lo | 0.9 | 0.454 | 276 | −12.5% | −4% | 26% |
| Starting Oil | >20 | N/A | 26,000 | | | |

[1]Lo and Hi denote acid strength of acidified ethanol (.15M and .30M, respectively)

TABLE VIII

Canola Oil Bleaches (3 wt.-% Clay)

| Clay | Red Color | Absorbance 450 nm 10 cm Cell | Chlorophyll PPB | Percent Improvement Red Color | Percent Improvement Absorbance | Percent Improvement Chlorophyll |
|---|---|---|---|---|---|---|
| Pure-Flo Supreme | 2.5 | 2.39 | 97 | | | |
| Treated Pure-Flo Supreme Lo[1] | 1.7, 1.8 | 1.799, 1.911 | 50, 55 | 30% | 22% | 46% |
| Treated Pure-Flo Supreme Hi[1] | 1.6, 1.6 | 1.594, 1.695 | 29, 34 | 36% | 31% | 32% |
| Filtrol 105 SF | 1.7 | 1.986 | 216 | | | |
| Treated Filtrol 105 SF Lo | 1.2 | 1.607 | 120 | 29% | 19% | 44% |
| Fulmont Premiere | 2.2 | 2.729 | 393 | | | |
| Treated Fulmont Premiere Lo | 1.7 | 1.753 | 97 | 23% | 36% | 75% |
| Tonsil Supreme | 1.9 | 2.004 | 129 | | | |
| Treated Tonsil Supreme Lo | 1.5, 1.3 | 1.691, 1.667 | 164, 163 | 26% | 16% | −27% |
| Gallion V2 | 1 | 1.493 | 92 | | | |
| Treated Gallion V2 Lo | 0.9 | 1.063 | 75 | 10% | 29% | 18% |
| Starting Oil | >20 | N/A | 26,000 | | | |

[1]Lo and Hi denote acid strength of acidified ethanol (.15M and .30M, respectively)

In Tables VII and VIII above, canola oil colors were read with a one inch path for the bleached oil samples treated with 1.5 wt.-% clay and a 5.25 inch path for the bleached oil samples treated with 3.0 wt.-% clay. Canola oil absorbance readings were read with a one cm cell for the bleached oil samples treated with 1.5 wt.-% clay and a 10 cm cell for the bleached oil samples treated with 3.0 wt.-% clay.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate. For example, the present method can be practiced as a batch process or as a continuous process, as desired. For a continuous process, a countercurrent flow of particulate clay and the acid-bearing polar liquid is preferred.

We claim:

1. A method for producing a bleaching clay which comprises selecting an intercalating clay mineral having a structure capable of receiving a polar organic liquid, combining the selected clay mineral with an admixture of an acid and a polar organic liquid having a polarity index greater than about 1.5 but less than that of water to produce a slurry, and thereafter recovering a bleaching clay from said slurry.

2. The method in accordance with claim 1 wherein the acid is an inorganic acid.

3. The method in accordance with claim 2 wherein the inorganic acid is sulfuric acid.

4. The method in accordance with claim 1 wherein the acid is an organic acid having a pKa value not greater than about 7.

5. The method in accordance with claim 4 wherein the organic acid is citric acid.

6. The method in accordance with claim 1 wherein the polar liquid is an aliphatic $C_1$ to $C_6$ monohydric alcohol.

7. The method in accordance with claim 6 wherein the alcohol is ethyl alcohol.

8. The method in accordance with claim 6 wherein the alcohol is isopropyl alcohol.

9. The method in accordance with claim 6 wherein the alcohol is methyl alcohol.

10. The method in accordance with claim 1 wherein the polar liquid is an aliphatic $C_2$ to $C_6$ ether.

11. The method in accordance with claim 10 wherein the ether is ethyl ether.

12. A bleaching clay produced in accordance with the method of claim 1.

13. A method for producing a bleaching clay which comprises combining an intercalating clay mineral, having a structure capable of receiving a polar organic liquid, with an acid and with a polar organic liquid which is a member of the group consisting of an aliphatic $C_1$ to $C_6$ monohydric alcohol and an aliphatic $C_2$ to $C_6$ ether.

14. The method in accordance with claim 13 wherein the clay is an attapulgite-smectite mixture.

15. The method in accordance with claim 13 wherein the clay is a palygorskite-smectite mixture.

16. The method in accordance with claim 13 wherein the clay is a smectite-opal mixture.

17. The method in accordance with claim 13 wherein said polar liquid combined with the clay is an aliphatic $C_1$ to $C_6$ monohydric alcohol.

18. The method in accordance with claim 17 wherein said aliphatic alcohol is ethanol.

19. The method in accordance with claim 18 wherein said acid is sulfuric acid.

20. A method for producing a bleaching clay which comprises combining a palygorskite-smectite mixture with ethanol and sulfuric acid to produce a slurry and thereafter drying the slurry to a volatile matter content of no more than about 35 weight percent.

21. The method of claim 20 wherein the produced slurry is dried to a volatile matter content of no more than about 20 weight percent.

22. The method of claim 20 wherein the produced slurry is dried to a volatile matter content of no more than about 10 weight percent.

23. A method for producing a bleaching clay which comprises combining an intercalating clay mineral, having a structure capable of receiving a polar organic liquid, with an acid and with an admixture of a polar organic liquid having a polarity index greater than about 1.5 but less than that of water and a non-polar organic liquid.

24. The method in accordance with claim 23 wherein the polar organic liquid is a member of the group consisting of an aliphatic $C_1$ to $C_6$ monohydric alcohol and an aliphatic $C_2$ to $C_6$ ether, and wherein the non-polar organic liquid is an aliphatic hydrocarbon.

25. The method in accordance with claim 23 wherein the polar organic liquid is ethanol and the non-poplar organic liquid is n-heptane.

26. The method in accordance with claim 23 wherein the polar organic liquid is isopropyl alcohol and the non-polar organic liquid is n-hexane.

27. The method in accordance with claim 23 wherein the polar organic liquid and the non-polar organic liquid form an azeotrope.

28. The method in accordance with claim 27 wherein the azeotrope is ethanol/n-hexane azeotrope.

29. The method in accordance with claim 27 wherein the azeotrope is ethanol/n-heptane azeotrope.

* * * * *

UNITED STATES PATENT AND TRADEMARK OFFICE
CERTIFICATE OF CORRECTION

PATENT NO. : 5,908,500
DATED : June 1, 1999
INVENTOR(S) : David D. Brooks et al.

It is certified that error appears in the above-indentified patent and that said Letters Patent is hereby corrected as shown below:

Col. 10, last line, footnote 2 should read as follows:

— [2] Thomas County, GA clays, Area 2
| | | |
|---|---|---|
| No. of Samples | 14 | 14 |
| Avg. Improvement | 9.13% | 10.74% |
| Std Deviation | 8.79% | 10.21% — |

Signed and Sealed this

Twenty-third Day of November, 1999

Attest:

Q. TODD DICKINSON

*Attesting Officer*  *Acting Commissioner of Patents and Trademarks*